(No Model.)

W. COHLMAN.
GALVANIC BATTERY.

No. 440,420. Patented Nov. 11, 1890.

Witnesses:
A. D. Troupe
Murray C. Boyer

Inventor:
William Cohlman
by his Attorneys
Howson & Howson

UNITED STATES PATENT OFFICE.

WILLIAM COHLMAN, OF PHILADELPHIA, PENNSYLVANIA.

GALVANIC BATTERY.

SPECIFICATION forming part of Letters Patent No. 440,420, dated November 11, 1890.

Application filed January 20, 1890. Serial No. 337,481. (No model.)

*To all whom it may concern:*

Be it known that I, WILLIAM COHLMAN, a citizen of the United States, and a resident of Philadelphia, Pennsylvania, have invented certain Improvements in Primary Batteries, of which the following is a specification.

One object of my invention is to so construct a voltaic battery as to render the same extremely compact, another object being to permit the ready examination of any cell of the battery when desired. These objects I attain in the manner hereinafter set forth, reference being had to the accompanying drawings, in which—

Figure 1:
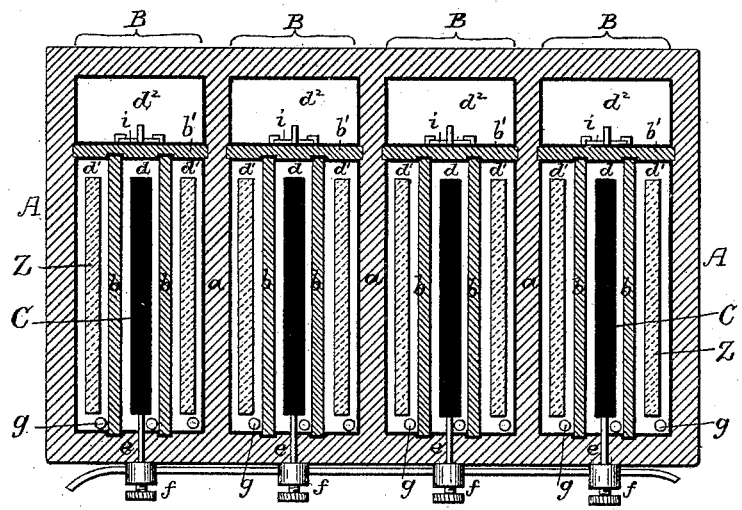
Figure 2:
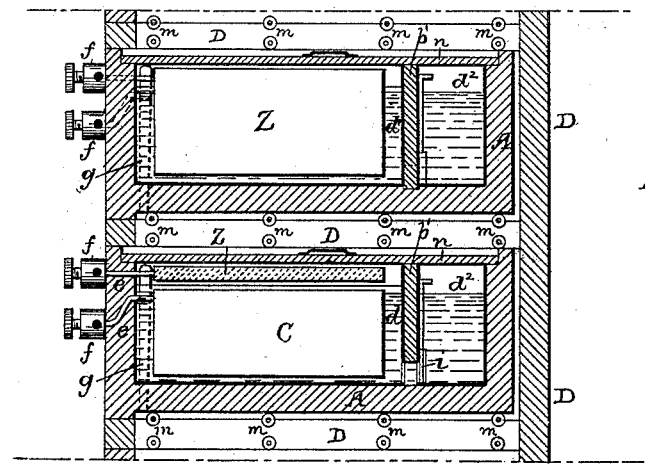
Figure 3:
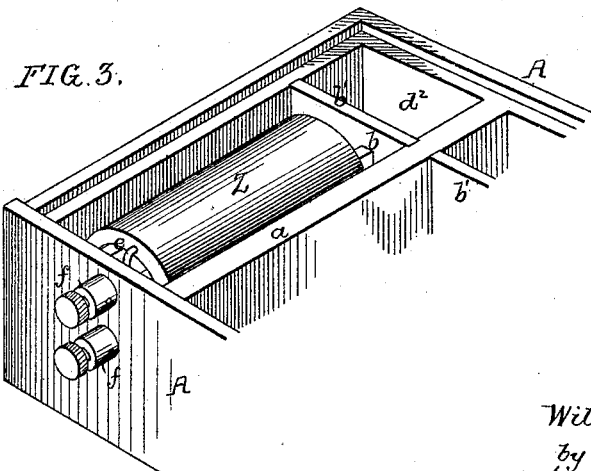

Figure 1 represents a sectional plan view of a battery of four cells constructed in accordance with my invention. Fig. 2 is a vertical section showing how a number of battery-cell casings are mounted in accordance with the invention, and Fig. 3 is a perspective view of one cell of the battery.

In Fig. 1, A represents a casing, rectangular in the present instance, and divided by partitions $a$ into four chambers or cells B, each of these chambers or cells being preferably lined with lead or other material which will not be injuriously affected by the acid compound of the cell, and each of these chambers or cells is divided by partitions $b$ and $b'$ into four compartments $d$ $d'$ and $d^2$, the compartment $d$ containing the carbon element C of the battery, and the compartments $d'$ receiving the depending ends of the curved or arched zinc element Z, the partitions $b$ being of earthenware or other porous material, as usual in batteries of this class. Each element of each cell has a stem $e$, projecting through the front of the box or casing A and terminating in a binding-post $f$, so that the various elements of the battery can be readily connected up either for quantity or intensity. Each box or casing A is closed at the bottom and has at the top a cap or cover $n$ to prevent the escape of noxious vapors from the cell, and in practice a number of such closed boxes or casings, with their battery elements, are mounted snugly one above another in a frame or casing D in a manner similar to the drawers of a cabinet, so that any one of the battery-boxes can be readily drawn out to permit of the inspection of its contents. As the boxes are closed at the top and are closely mounted in the frame D, I carry the terminals of each element to the binding-posts on the front of the box, so that ready coupling up of the elements is permitted and the connections do not interfere with the ready insertion and removal of the boxes.

In the bottom of the box A, at the front end of each compartment $d$ $d'$ of each cell of the battery, is a drainage-opening, which is normally closed by a plug $g$ of glass or other material not injuriously affected by the liquid contents of the cell, this plug extending above the level of said liquid contents, so that it can be readily withdrawn when it is desired to drain the cell preparatory to renewing the solution. The enriching of the solution in the compartment $d$ of each cell may, however, be effected when desired by opening a communication between said compartment and the compartment $d^2$ at the back of the cell, in which compartment is stored a concentrated form of the same solution.

The communication may be controlled by a slide $i$, or other suitable means easily operated when the drawer is drawn out.

In order to facilitate the insertion of each battery-box into or its withdrawal from the frame or cabinet D, the latter is provided with anti-friction rollers $m$, serving as guides and supports for the boxes, as shown in Fig. 2.

Having thus described my invention I claim and desire to secure by Letters Patent—

The combination, in a multiple-cell battery, of a frame and a series of battery-cells fitting closely in said frame, and each consisting of a closed box partitioned to form compartments for the battery elements and having the conductors for said elements carried through the front of the box to binding-posts on the outside of the same, substantially as specified.

In testimony whereof I have signed my name to this specification in the presence of two subscribing witnesses.

WILLIAM COHLMAN.

Witnesses:
  JNO. E. PARKER,
  HARRY SMITH.